United States Patent
Alvarez et al.

(10) Patent No.: US 10,803,676 B2
(45) Date of Patent: *Oct. 13, 2020

(54) 3D SCENE RECONSTRUCTION USING SHARED SEMANTIC KNOWLEDGE

(71) Applicant: Intel Corporation, Santa Clara, CA (US)

(72) Inventors: Ignacio J. Alvarez, Portland, OR (US); Ranganath Krishnan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,965

(22) Filed: Feb. 25, 2019

(65) Prior Publication Data

US 2019/0259221 A1    Aug. 22, 2019

Related U.S. Application Data

(63) Continuation of application No. 15/089,173, filed on Apr. 1, 2016, now Pat. No. 10,217,292.

(Continued)

(51) Int. Cl.
*G06T 19/00* (2011.01)
*G06T 19/20* (2011.01)
(Continued)

(52) U.S. Cl.
CPC .............. *G06T 19/20* (2013.01); *G06T 17/00* (2013.01); *G06T 17/20* (2013.01); *H04L 67/42* (2013.01);
(Continued)

(58) Field of Classification Search
CPC ......... G06T 19/20; G06T 17/00; G06T 17/20; H04L 67/42
See application file for complete search history.

(56) References Cited

U.S. PATENT DOCUMENTS 9,129,433 B1    9/2015  Korobkin
2009/0109240 A1   4/2009  Englert et al.
(Continued)

OTHER PUBLICATIONS

International Search Report and Written Opinion dated Jan. 4, 2017 from International Application No. PCT/US2016/052938, 17 pages.
(Continued)

*Primary Examiner* — Sarah Lhymn
(74) *Attorney, Agent, or Firm* — Schwabe, Williamson & Wyatt, P.C.

(57) ABSTRACT

According to various embodiments, devices, methods, and computer-readable media for reconstructing a 3D scene are described. A server device, sensor devices, and client devices may interoperate to reconstruct a 3D scene sensed by the sensor devices. The server device may generate one or more models for objects in the scene, including the identification of dynamic and/or static objects. The sensor devices may, provide model data updates based on these generated models, such that only delta changes in the scene may be provided, in addition to raw sensor data. Models may utilize semantic knowledge, such as knowledge of the venue or identity of one or more persons in the scene, to further facilitate model generation and updating. Other embodiments may be described and/or claimed.

22 Claims, 5 Drawing Sheets

Related U.S. Application Data

(60) Provisional application No. 62/260,036, filed on Nov. 25, 2015.

(51) Int. Cl.
    *G06T 17/00*     (2006.01)
    *G06T 17/20*     (2006.01)
    *H04L 29/06*     (2006.01)

(52) U.S. Cl.
    CPC ...... *G06T 2200/16* (2013.01); *G06T 2210/08* (2013.01); *G06T 2219/024* (2013.01)

(56) References Cited

U.S. PATENT DOCUMENTS

2010/0250588 A1     9/2010     Kita
2012/0194513 A1     8/2012     Sakurai et al.
2016/0140761 A1     5/2016     Saunders et al.
2018/0075648 A1*     3/2018     Moghadam ........... G01S 7/4808

OTHER PUBLICATIONS

Hmida et al., "Semantic-based Technique for the Automation the 3D Reconstruction Process," In: SEMAPRO Oct. 2010: The Fourth International Conference on Advances in Semantic Processing, pp. 191-198.

Office Action dated May 19, 2017 for U.S. Appl. No. 15/089,173, 16 pages.

Final Office Action dated May 19, 2017 for U.S. Appl. No. 15/089,173, 20 pages.

Office Action dated Mar. 8, 2018 for U.S. Appl. No. 15/089,173, 17 pages.

\* cited by examiner

3D SCENE RECONSTRUCTION USING SHARED SEMANTIC KNOWLEDGE

RELATED APPLICATION

This application is a continuation of U.S. application Ser. No. 15/089,173, filed Apr. 1, 2016, entitled "3D SCENE RECONSTRUCTION USING SHARED SEMANTIC KNOWLEDGE," which claims the benefit of provisional application 62/260,036 filed Nov. 25, 2015 and entitled "Distributed Semantic-Based Decision Logic for Immersive System Client Server Optimization". The Specifications of the Ser. No. 15/089,173 and 62/260,036 applications are hereby each incorporated by reference herein in their entirety for all purposes.

TECHNICAL FIELD

The present disclosure relates to the fields of networking and computing. In particular, the present disclosure is related to model-based, shared semantic knowledge three-dimensional (3D) scene reconstruction.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Bandwidth economy is a general constraint between clients and servers due to the high impact of data exchange on client compute resources and battery life. Such constraints may occur when client devices need to send data to a cloud server in order to process it or when a cloud server needs to stream processed data to a device at fast rates to enable a customer experience on the client side. In the case of 3D scene reconstruction at the client device, these difficulties can happen when multiple camera sensors might share the same network, switch, and/or base station in order to upload frame updates to the cloud server. Such constraints can lead to reduced experience for users.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
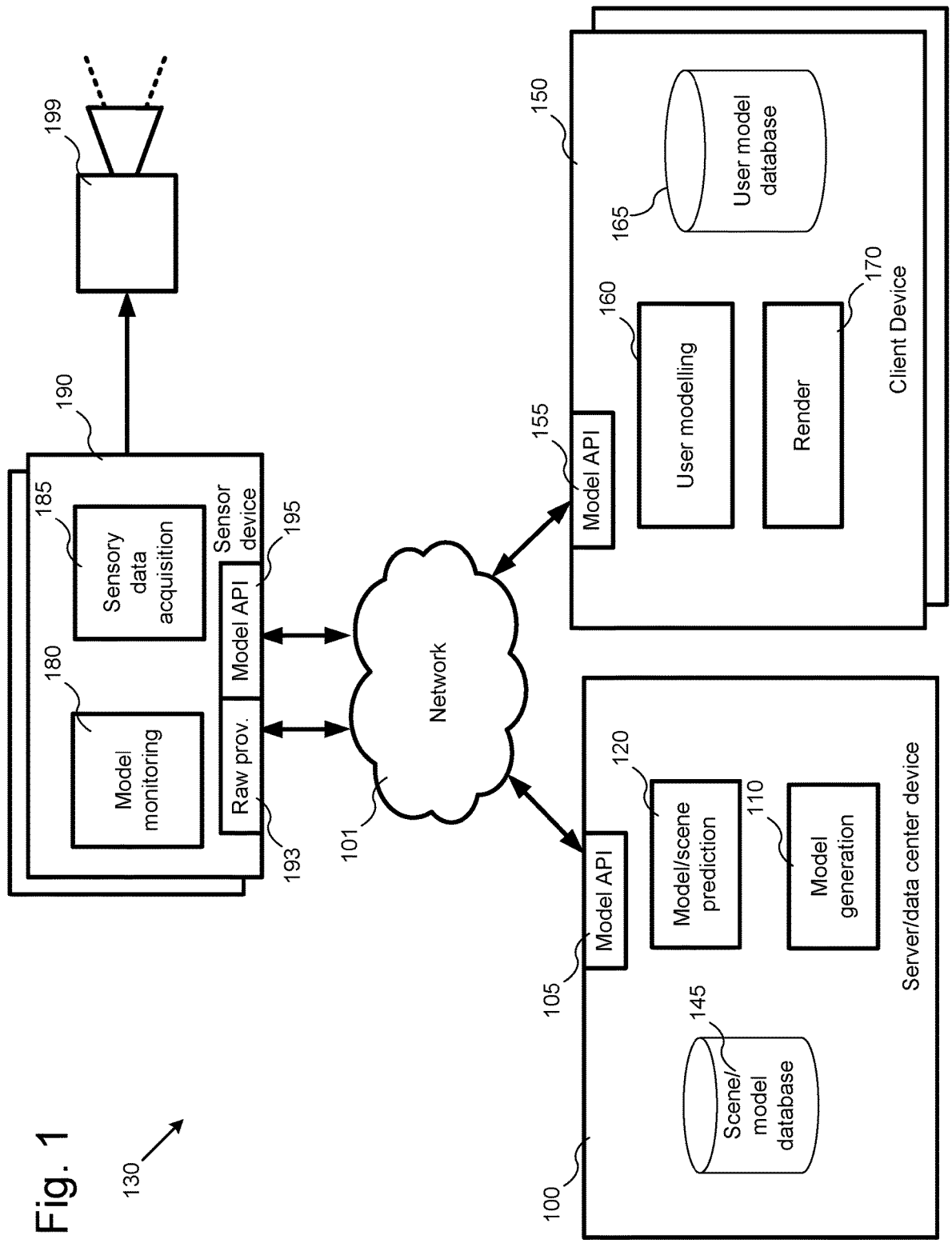
FIG. 1 illustrates example components of a semantic/model-based scene reconstruction system, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a server device, one or more sensor devices, and one or more client devices may interoperate via a network to facilitate a client device to reconstruct a 3D scene sensed by the one or more sensor devices. For example, a conference room may be incorporated with sensor devices that include cameras that may gather raw visual and depth data; the server device may facilitate later reconstruction of the 3D scene of the conference room at a client device. The server device (operating with the client device) may generate one or more models for objects in the conference room being reconstructed in a 3D scene at the client device, including the identification of dynamic and/or static objects. The sensor devices may, in turn provide model data updates based on these generated models, such that only delta changes in the scene may be provided. The sensor devices may thus provide updates to models as well as raw sensor data, and may facilitate the server device in generating and updating the models. These models may utilize semantic knowledge, such as knowledge of the venue or identity of one or more persons in the scene, to further facilitate model generation and updating. This semantic/model usage may reduce the amount of data which may be sent between devices, thus reducing bandwidth needs. The server device may also utilize prediction of models to further hone bandwidth needs.

In various embodiments, the instant techniques may be different from current systems in that current systems are mostly unidirectional in terms of decision logic for data transmissions. Further, in provision of sensor data, in current systems either a server requests a refresh rate update or a sensor device may pushes predefined data at specified rates. However, all these solutions look at the data transmission problem from the infrastructure point of view. The services governing data exchange do not have actual knowledge of the kind of data as the transport protocol may abstract from the data content. In contrast, as described earlier, the present disclosure includes a distributed logic in the shape of a stochastic process for generation and updating of models that governs data exchange based on model data and semantic knowledge. In various embodiments, the server device, sensor devices, and client devices may utilize a model-supportive application programming interface (API) to communicate model data rather than raw data when those are sufficient to guarantee user experience.

FIG. 1 illustrates components of a semantic/model-based scene reconstruction system, in accordance with various embodiments. As illustrated, the semantic/model-based scene reconstruction system 130 may include a number of client devices 150 (CD 150s) coupled with a server device 100 (SD 100) via network 101. Client devices 150 and server device 100 may be respectively configured to provide for client side and server side activities of an application, such as an immersive application, that include generation and provision of model data describing one or more 3D scenes, such as for rendering on CD 150 for one or more users of the CD 150. In various embodiments, the SD 100 and/or CD 150s may also be configured to communicate with one or more sensor devices 190 (SND 190s). The SND 190s may be configured to provide visual and/or other information regarding the 3D scenes to the SD 100 and or CD 150s. In various embodiments, the SND 190s may be communicatively coupled to cameras 199 and/or other sensory instruments which may be configured to acquire sensor data, visual data, depth data, temperature data, and or other data in order to facilitate provisioning of the model data.

As described in greater detail below, the client side and server side of the immersive application may be incorporated with distributed semantic-based decision logic for generation and provisioning of data associated with the 3D scenes such that bandwidth usage may be reduced compared to other techniques. For example, in one usage scenario, SND 190s may include one or more cameras 199 (or devices associated with cameras 199) placed in a location such as a conference room transmitting over the network to an SD 100, such as at a data center. The SD 100 may then, in turn, stream or otherwise provision model data to a CD 100 in a different location for rendering of the conference room.

In embodiments, the CD 150s, SD 100, and/or SND 190s may be configured, upon establishing a connection, to individually and/or cooperatively utilize semantic knowledge of the 3D scene being reconstructed to facilitate generation and provisioning of model data. For example, the CD 150s, SD 100, and/or SND 190s may identify a use case (conference call in the above example) and the spatial characteristics of the location for which model data is being provided. For example, the CD 150s, SD 100, and/or SND 190s may be configured to use initial data shared over a connection to obtain data describing the 3D scene, including parameters such as, but not limited to, object color, object shapes, object positioning, lighting, texture, color, etc. The results may be used, such as by the SD 100, to generate object models (e.g., object models for representation of activity in the conference room, in the above example), and initiate tagging (e.g., recognition of elements) of objects. In various embodiments, the SD 100 may identify static objects that do not need to be streamed (e.g., table, door, etc. in the above example). Thereafter, rather than stream, or otherwise provide, raw data describing the scene, the SD 100 may provide (and update) model data describing the existing static object models. As a result, a much more light-weight data structures (e.g., JavaScript Object Notation, or JSON structure) may be used to contain the tagged updates. In another example, the the CD 150s, SD 100, and/or SND 190s may utilize knowledge of an identity of one or more persons in the location, and/or other information about the one or more persons, such as age, gender, ethnicity, etc. In some embodiments, such information about the one or more persons may be obtained from one or more databases regarding possible persons that may be using the location, including employee data and/or scheduling databases.

Similarly, the SD 100 may identify one more dynamic objects, which may be objects which are likely to change position, shape, etc. (e.g., a person in the conference room in the above example, a white board which is being actively written on, etc.). This identification may be performed through identification of objects which are more likely to change, such as by determining such as likelihood and comparing this likelihood to a threshold. In various embodiments, the SD 100 may generate model data describing these dynamic objects. The SD 100 may generate these models using preexisting models (e.g., human models, which may include pre-determined models for known persons, for the above example) of similar characteristics (e.g., body complexion) and texture mapping for each dynamic object (e.g., a person in the above example). Once these dynamic object models are created and/or loaded from preexisting models, delta data describing changes in the models (e.g., body pose or position, in the above example) can be exchanged via the same content based API. In various embodiments, the SD 150 may be configured to predict changes that may occur with various dynamic models in order to provide delta model data. This data may then be updated based on updates received from the one or more SND 190s. In various embodiments, the SD 100 may be configured to identify certain areas (such as facial expression or hand gestures in the above example) for generation of model data with a higher fidelity, as opposed to a standard/default lower fidelity, which may be utilized for purposes of greater efficiency. For these areas requiring higher fidelity, more complicated prediction models may be employed.

In various embodiments, the CDs 150 and the SD 100 may individually or jointly determine a tradeoff between probabilistic computation of the model, along with delta model data exchange, and the use of raw sensor data from the SND 190s. In embodiments, the determination of the tradeoff may be jointly made by the SND 190s and the SD 100. In some embodiments, where the SND 190s have sufficient computing resources, some of the computations to determine the tradeoff may be distributed to these devices rather than performed entirely by the SD 100. However, in other embodiments, if the SND 190s are relatively limited in the degree to which they can perform computations, the models may be developed mostly or entirely by the SD 100 and the distributed decision logic may push the model data back to the SND 190s such as generated models with prediction boundaries.

In various embodiments, the SND 190s may obtain or check real-time sensor data, such as visual data, depth data, temperature data, etc. and compare such sensor data with the generate content model and only stream a portion of the raw data (e.g. raw data relating to facial features, for the above example) of dynamic objects. The SND 190s may then provide other data relating to models, such as positional or orientation updates (e.g. chair rotated on a certain angle, in the above example). This behavior can be maintained to optimize and reduce bandwidth requirements while models remain valid for a given location. For other dynamic situations (e.g., in the case of one of the persons standing up on the conference room and starting to draw on a blackboard, in the above example), the SD 100 may be configured to generate (alone or in conjunction with the SND 190s) a new model to account for the change. In various embodiments, while the new model is being generated, the SD 100 and/or SND 190s may temporarily revert back to utilizing higher-bandwidth communications of raw data.

In various embodiments, the SD 100 and/or SND 190s may be configured to maintain a particular quality of service (or range of quality of service) via the above-discussed model data exchange. In embodiments, the CDs 150 may also participate in maintaining a quality of service, such as by sharing user data for a user reviewing the reconstruction of the 3D scene. For example, a CD 150 may provide information regarding a field-of-view of the 3D scene, which may be utilized by the SD 100 and/or SND 190s for predicting model data. For example, in various embodiments, the SD 100, SND 190s, and CD 150s may utilize a field-of-view based voxels model in after 3D reconstruction for every object to further optimize bandwidth for transmission. For example, though a 3D object will have multiple field of views, at an instance user will have a single field of view at the display. The SD 100, SND 190s, and CD 150s may be further configured to optimize bandwidth usage based on the view point prediction updates by transmitting only model data the necessary given a field of view.

In various embodiments, as illustrated in FIG. 1, the SD 100, SND 190s, and CD 150s may include one or more modules to perform the model-based 3D reconstruction techniques described herein. For example, the SD 100 may include a model generation module 110 (MG 110), which may be configured to generate one or more models for a 3D scene based on data received by one or more SND 190s. In various embodiments, the MG 110 may be configured to identify one or more static and/or dynamic objects and to tag objects as static or dynamic accordingly. In various embodiments, the MG 110 may be configured to identify dynamic objects based on a semantic knowledge that an object is likely to move (e.g., a person) or based on a prediction of a probability that an object is likely to move (e.g. a pen in close proximity to a person). In various embodiments, the MG 110 may be configured to identify objects as dynamic by comparison of a prediction of a probability that an object is likely to move to one or more predetermined thresholds. In various embodiments, such static/dynamic identification may be performed based on semantic knowledge of the location, objects, and/or persons identified in the location being reconstructed; such information and/or identification may be provided to the MG 110 by the SND 190. In various embodiments, models generated by the MG 110 may be submitted to a scene/model database 145 (MDB 145) for storage and/or later retrieval. While the MDB 145 is illustrated as being a part of the SD 100, in various embodiments, the MDB 145 may be located apart from the SD 100 and may be communicatively coupled to the SD 100, such as through a wired connection or a connection via network 101.

In various embodiments, the SD 100 may also include a model/scene prediction module 120 (MP 120). In various embodiments, the MP 120 may be configured to predict changes to a 3D scene being reconstructed based on a generated model (such as generated by the MG 110 and/or one or more SND 190s). In various embodiments, the MP 120 may be configured to predict movement, orientation changes, lighting changes, and or other predictable changes that may occur with respect to one or more models in the location which is being reconstructed.

In various embodiments, a CD 150 may also include one or more modules to perform the model-based 3D reconstruction techniques described herein. In various embodiments, the CD may include a render module 170. The render module 170 may be configured to render a 3D scene based on model data and/or raw data provided by the SD 100. In various embodiments, such rendering may occur at a regular refresh rate, and or upon request by a user of the CD 150. In various embodiments, the render module 170 may be configured to request refresh of the model data and/or raw scene data from the SD 100. The CD 150 may also include a user modelling module 160 (UM 160) which may be configured to provide data regarding the user to the SD 100 and/or the SND 190s. In various embodiments, the UM 160 may provide field-of-view information, such as a viewing angle and or a size of a field-of-view, which may be utilized by the SD 100 (and in particular by the MP 120) to reduce the amount of data which may need to be measured, modeled, and/or transmitted, thus reducing bandwidth requirements. Additionally, the CD 150 may include a user model database 165 (UDB 165) which may be configured to store models information that is provided by the SD 100. In various embodiments the UDB 165 may additionally store past model data, such as model data for previously reconstructed scenes, in order to reduce future bandwidth usage.

In various embodiments the SND 190s may also include one or more modules to perform the model-based 3D reconstruction techniques described herein. For example, an SND 190 may include a sensor data acquisition module 185 (SDA 185) for acquiring sensory data, such as from a camera 199 or other sensory instrument. In various embodiments, the SDA 185 may be configured to acquire the sensory data for later provisioning to the SD 100 and/or the CD 150s. In various embodiments, the SDA 185 may be configured to provide the acquired data directly as raw data, such as through raw data provision communication module 193. In other embodiments, the SDA 185 may be configured to provide the sensory data to a model monitoring module 180 (MM 180). The MM 180 may be configured to determine changes to a scene and to provide delta model data to the SD 100 based on a model generated by the SD 100 (such as by the MG 110) as model changes are determined. In other embodiments, the MM 180 may be configured to determine that a change has occurred to a generated model and to provide changes to the model to the SD 100. In yet other embodiments, the MM 110 may be configured to generate models for one or more objects itself and to provide data describing such models to the SD 100.

In various embodiments, as illustrated in FIG. 1, the SND 190s, SD 100, and CD 150 may be configured to communicate model data (such as generated models and/or delta model data) using predictive model API (illustrated as model API 195, 105, and 155, respectively). In various embodiments, these predictive model APIs may be configured to facilitate communication of model data in compact representations (e.g. JSON objects) such that bandwidth requirements for communication are decreased.

While further examples of computing devices are discussed below, in various embodiments, network 101, SD 100, CD 150s, and/or SND 190s may be any one of such elements known in the art. SD 100, CD 150s, and/or SND 190s may include processor and memory, e.g., processor with one or more processor cores, volatile and/or non-volatile memory. I/O devices may include wired and/or wireless communication interfaces. The SND 190s may be associated with any one of a number of sensory instruments, e.g., cameras. CD 150s may include devices such as be smartphone, tablet, laptop, desktop, set-top box, game console, and so forth. Network 101 may include private and/or public networks, such as the Internet, with any number of wired and/or wireless gateways, routers, switches and so forth. Aspects such as video/audio data transmissions, algorithms/techniques for 3D voxel generation, and algorithms/techniques for model recognition are known, and are not further described herewith.

Figure 2:
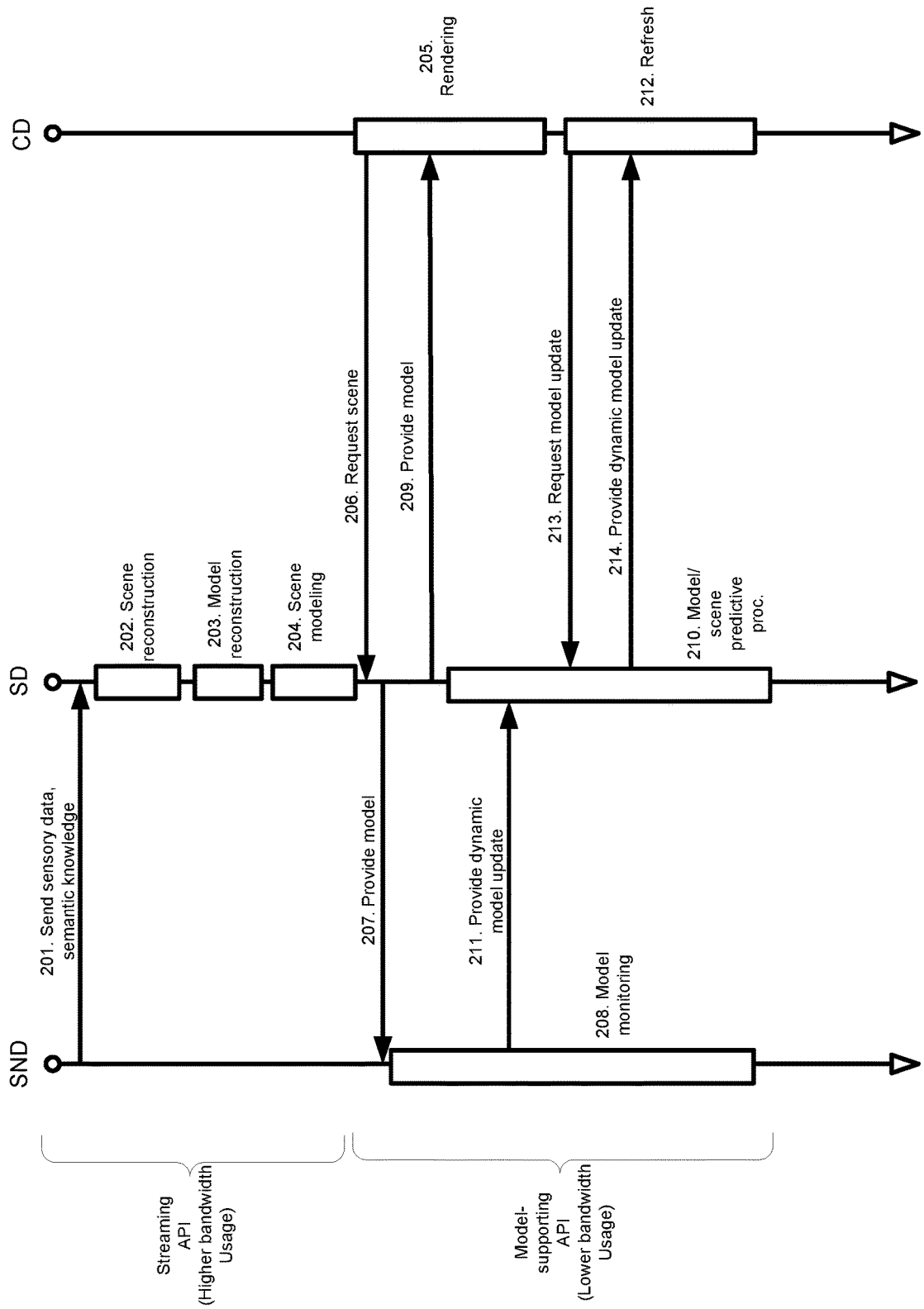
FIG. 2 illustrates an example process for the semantic/model-based scene reconstruction system to reconstruct a scene, in accordance with various embodiments.

FIG. 2 illustrates an example process for the semantic/model-based scene reconstruction system to reconstruct a scene, in accordance with various embodiments. In various embodiments, algorithmic structures for the various modules of the SND 190s, SD 100, and CD 150 may be described with reference to FIG. 2. It may be noted that, while particular ordering of information flows, model generation, and determinations are illustrated, in various embodiments, operations may be otherwise ordered or omitted, or additional operations may be included. The process may begin at operation 201, where one or more SND 190s may send sensory data to the SD 100. In various embodiments, as discussed above, the sensory data may include visual information, depth information (such as depth from a camera 199), temperature information, movement information, etc. In various embodiments, at operation 201, the SND 190s may also send information about locations of the various cameras 199 or other sensory instruments used to acquire the sensory information. At operation 201 the SND 190s may also send semantic knowledge of the location or scene being reconstructed, including room layout, objects known or suspected to be in the room, types of objects, persons known or suspected to be in the scene, etc. It may be noted that, in various embodiments, the information provided by at operation 201 may be sent via known streaming APIs, and thus may represent a higher bandwidth usage than other, model-based communications discussed below.

Next, at operation 202, the SD 100, and in particular the MG 110, may perform a 3D scene reconstruction of the location to arrive at a 3D set of voxels from which models may be generated. This scene reconstruction may be performed using known techniques. Next, at operation 203, the MG 110 may perform model generation on the reconstructed scene in order to generate individual object models in the scene. The MG 110 may also identify each of the identified objects as dynamic or static based on sensory information and/or semantic knowledge. Thus, if objects are currently moving, or are of a type that is likely to move, they may be tagged as dynamic. Next, at operation 204, the MG 110 may perform scene modeling on the objects, to generate a complete model of the scene, including static and dynamic objects. It may be noted that, in some embodiments, known techniques may be used to generate models from sensory data obtained from the SND 190s, however, these techniques may be augmented by the semantic knowledge techniques described herein.

As illustrated in FIG. 2, the subsequent operations may, in various embodiments, utilize model-supportive APIs, such as those discussed above, to facilitate sharing of model data rather than streaming of raw sensory data. Thus, at operation 205, the render module 170 may begin a rendering process on a CD 150, such as in response to a request of a user of the CD 150 to view a reconstructed scene. In response, the render module 170 may request the scene from the SD 100 at operation 206. In response, the SD 100 may provide the generated model to both the SND 190s as well as the CD 150. Thus, at operation 207, the SD 100 may provide the generated model to the SND 190s so that the SND 190s may look for changes which have occurred in the scene over the generated model. The SND 190s may, at operation 208, in turn begin a model monitoring process, such as by the MM 180. The SD 100 may also, at operation 209, provide the generated models to the render module 170 in order that the render module may begin rendering of the 3D scene.

After an initial rendering of the 3D scene, the SD 100, SND 190s, and the CD 150 may interoperate to refresh the scene so that the user of the CD 150 is provided with an up-to-date rendering. At operation 210 the MP 120 of the SD 100 may begin a model/scene prediction process to predict changes that may occur in the model as scene reconstruction continues. At operation 211, the SND 190 may provide a dynamic model update, which may include changes to one or more dynamic objects in the current model within range of the predicted behavior. This dynamic model update may be provided to the MP 120. This updating may, in various embodiments, occur independently of any refresh performed by the CD 150. At operation 212, the render module 170 may perform a refresh process and, as part of this process may request a model update at operation 213. At operation 214, the MP 120 may respond by providing dynamic model updates, such as changes to one or more dynamic model objects identified in the model. The render module 170 may utilize these updates to update the rendered scene for the user of the CD 150.

Figure 3:
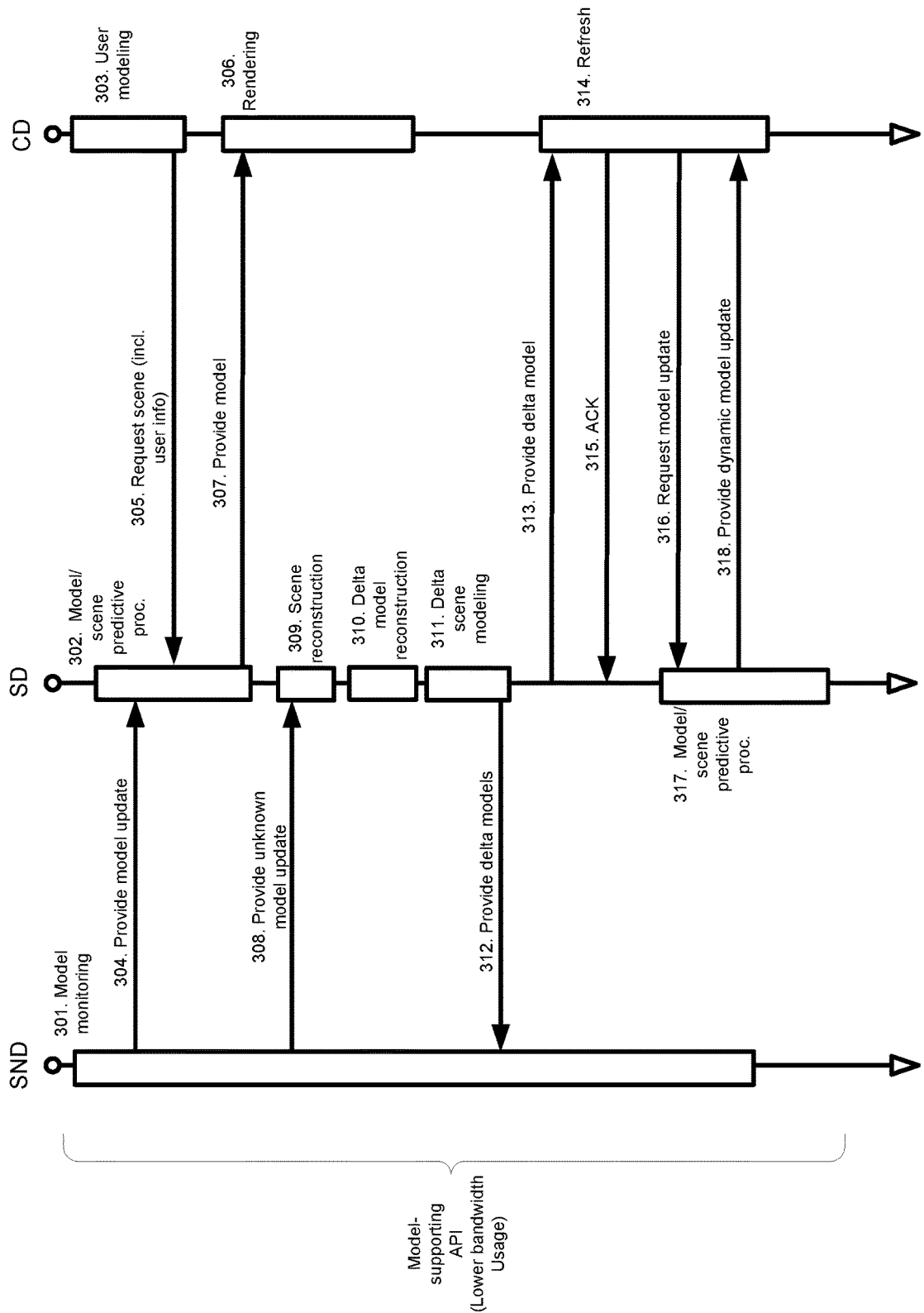
FIG. 3 illustrates a further example process flows for the semantic/model-based scene reconstruction system to continue to reconstruct a scene, in accordance with various embodiments.

FIG. 3 illustrates a further process for the semantic/model-based scene reconstruction system to continue to reconstruct a scene, in accordance with various embodiments. In various embodiments, algorithmic structures for the various modules of the SND 190s, SD 100, and CD 150 may be described with reference to FIG. 3. It may be noted that, while particular ordering of information flows, model generation, and determinations are illustrated, in various embodiments, operations may be otherwise ordered or omitted, or additional operations may be included. The process may begin at operation 301, where the MM 180 may continue a model monitoring process, such as based on a model previously received from the SD 100. The SD 100 may likewise continue a model/scene prediction process at the MP 120 at operation 302. The CD 150 may, at operation 303, perform a user modeling process by the UM 160 to identify needed user information which may be used to obtain model data for rendering by the render module 170 of the CD 150. At operation 304, the MM 180 may provide model updates to the MP 120, as discussed above. At operation 305, the UM 160 may request a scene, with the request including user information, such as field-of-view information for the scene. The CD 150 may begin (or continue) a rendering process by the render module 170 and, at operation 307, may receive an updated model from the MP 120.

At operation 308, however, one or more MM 180s of SND 190s may provide an unknown model update, indicating that an update has occurred which is not supported by the currently available object models and scene prediction model. For example, a new person may enter a reconstructed conference room, or an object may become hidden behind another object. In such an occurrence, the unknown model update may cause the MG 110 to regenerate (or update) the currently used model. Thus at operation 309, the MG 110 may perform a scene reconstruction, followed by a delta model reconstruction at operation 310 to identify new, missing, or changed models over the previously used model. The MG 110 may then perform a delta scene modeling to generate changes over the previously used scene model. At operations 312 and 313, the SD 100 may provide these delta models to the SND 190s and CD 150, respectively, in order to update the models used by these devices. It may be noted that, by only sending delta model data, the SD 100 may reduce bandwidth requirements over those which would be utilized if entire models were sent after a change.

In response to receipt of the delta model, the render module 170 of the CD 150 may, at operation 314, begin a refresh process and may, at operation 315, acknowledge receipt of the delta model in order that the SD 100 may be confirmed that the CD 150 is aware of the model changes and can be given model updates based on the new model. Next, at operation 316, the render module 170 may, as a continued part of its refresh process, request a model update at operation 317. This may be received by a continued (or newly started) model/scene prediction process at 317, and dynamic model updates may be provided at operation 318, such as changes to one or more dynamic model objects identified in the model. The render module 170 may then utilize these updates to update the rendered scene for the user of the CD 150.

Figure 4:
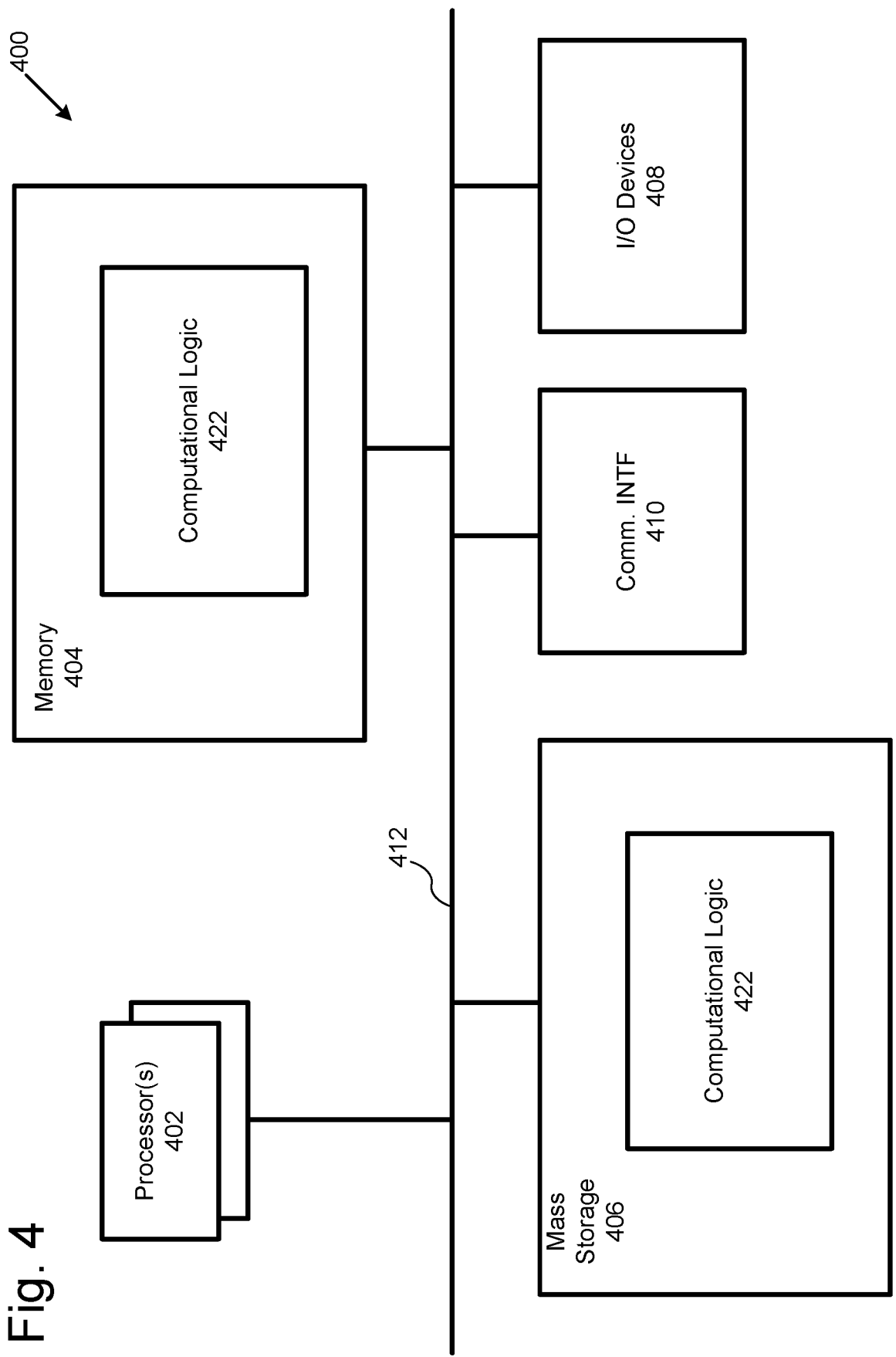
FIG. 4 illustrates an example computing environment suitable for practicing various aspects of the present disclosure, in accordance with various embodiments.

Referring now to FIG. 4, wherein a block diagram of an example architecture of a computing device suitable for use to practice as either a client or a server of the present disclosure, in accordance with various embodiments, is illustrated. As shown, computing device 400 may include one or more processors or processor cores 402, and persistent memory 404. In embodiments, multiples processor cores 402 may be disposed on one die. For the purpose of this application, including the claims, the terms "processor" and "processor cores" may be considered synonymous, unless the context clearly requires otherwise. Additionally, computing device 400 may include communication interfaces 410, such as, Ethernet, WiFi, Bluetooth, 3G/4G and so forth, and I/O device 408 may include cameras, display devices, keyboard, cursor control and so forth. The elements may be coupled to each other via system bus 406, which may represent one or more buses. In the case of multiple buses, they may be bridged by one or more bus bridges (not shown).

Each of these elements may perform its conventional functions known in the art. In particular, persistent memory 404 may be employed to store a copy of computing logic 422 implementing the operations described earlier, e.g., but not limited to, determining the static and dynamic models, determining the tradeoffs between using raw data and models/API with subset of data, and so forth. Computing logic 422 may be implemented in assembler instructions supported by processor(s) 402 or high-level languages, such as, for example, C or a scripting language, that can be compiled into such instructions. The programming instructions may be placed into persistent memory 404 in the factory, or in the field, through, for example, a distribution medium (not shown), such as a compact disc, or through communication interface 410 (from a distribution server (not shown)). The number, capability and/or capacity of these elements 402-410 may vary from embodiments to embodiments and/or depending on whether computing device 400 is used as CD 150, SD 100, and/or SND 190. The constitutions of these elements 402-410 are otherwise known, and accordingly will not be further described.

Figure 5:
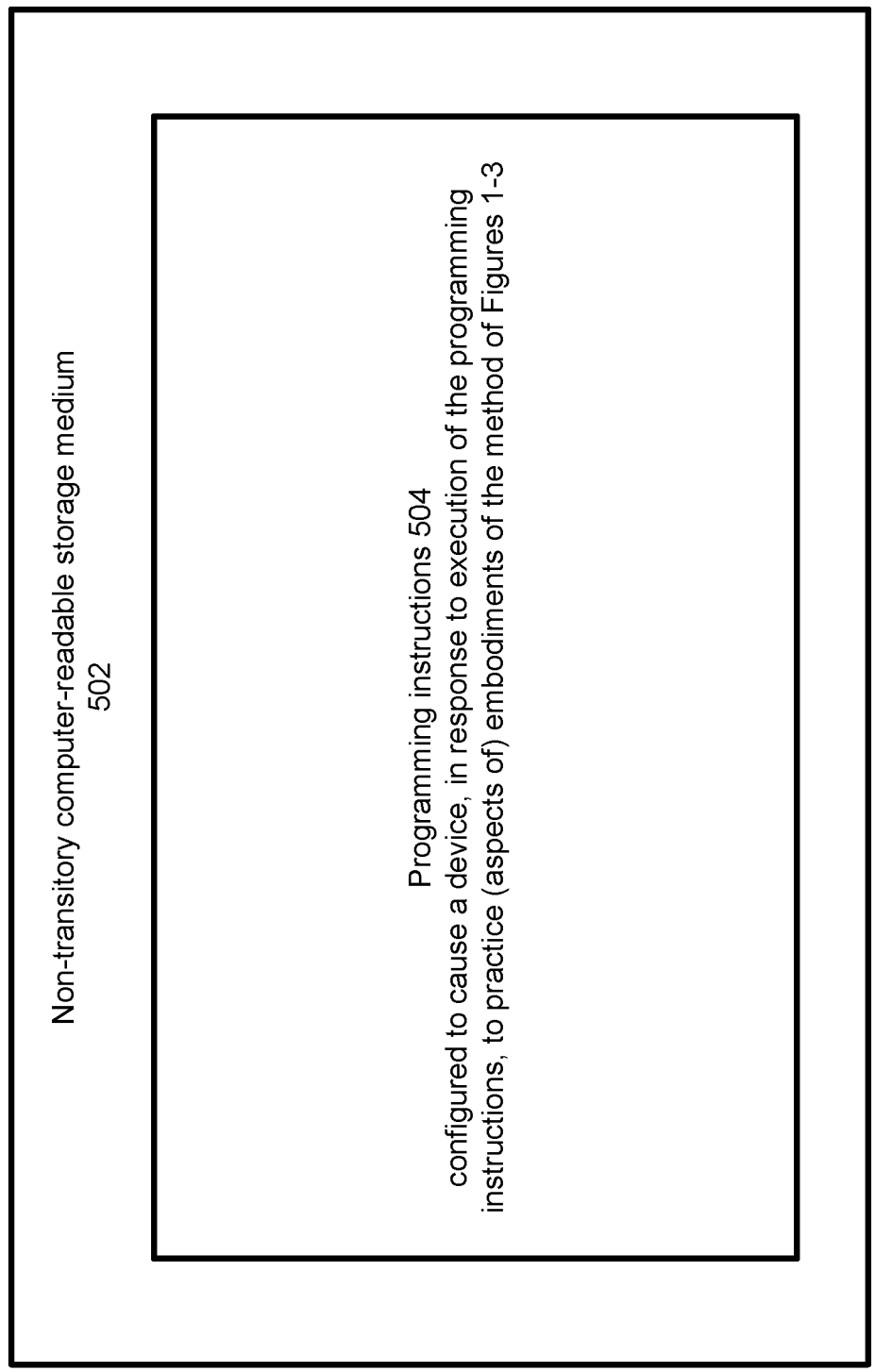
FIG. 5 illustrates an example storage medium with instructions configured to enable an apparatus to practice various aspects of the present disclosure, in accordance with various embodiments.

FIG. 5 illustrates an example non-transitory computer-readable storage medium having instructions configured to practice all or selected ones of the operations associated with CD 150, SD 100, and/or SND 190, and so forth, earlier described, in accordance with various embodiments. As illustrated, non-transitory computer-readable storage medium 502 may include a number of programming instructions 504. Programming instructions 504 may be configured to enable a device, e.g., CD 150, SD 100, and/or SND 190, in response to execution of the programming instructions, to perform various operations earlier described. In alternate embodiments, programming instructions 504 may be disposed on multiple non-transitory computer-readable storage media 502 instead. In still other embodiments, programming instructions 504 may be encoded in transitory computer readable signals. The programming instruction may also include piece of software that protects or encrypts the data in the memory, storage, data being processed, and in communication channel being exposed to the hackers.

Referring back to FIG. 4, for one embodiment, at least one of processors 402 may be packaged together with a computer-readable storage medium having computing logic 422 (in lieu of storing in system memory 404) configured to practice all or selected aspects of the earlier described semantic/model operations. For one embodiment, at least one of processors 402 may be packaged together with a computer-readable storage medium having computing logic 422 to form a System in Package (SiP). For one embodiment, at least one of processors 402 may be integrated on the same die with a computer-readable storage medium having computing logic 422. For one embodiment, at least one of processors 402 may be packaged together with a computer-readable storage medium having computing logic 422 to form a System on Chip (SoC).

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include, a server device, including one or more computer processors. The server device may include a model/scene predictor to operate on the one or more computer processors to predict changes to a three-dimensional (3D) scene, wherein to predict changes to the 3D scene, the model/scene predictor may be to provide model data describing a model of the 3D scene to a client device for reconstruction of the 3D scene on the client device, wherein the model data may be based at least in part on a shared semantic understanding of the scene by the server device and the client device.

Example 2 may include the server device of example 1, wherein the model data may include data describing static and dynamic objects and the model/scene predictor may be to provide data representing dynamic objects at a greater rate than a rate used for providing data representing static objects.

Example 3 may include the server device of example 2, wherein the model/scene predictor may be to determine that an object may be a dynamic object based on a prediction that the object may be more likely to change than a predetermined threshold.

Example 4 may include the server device of example 3, wherein model/scene predictor may be to determine the prediction that the object may be more likely to change based on a semantic understanding of the type of object.

Example 5 may include the server device of example 4, wherein the model/scene predictor may be to determine that a first object represents a person, and, subsequently that the first object may be a dynamic object.

Example 6 may include the server device of example 2, wherein the model/scene predictor may be to provide delta data for one or more of the dynamic objects.

Example 7 may include the server device of any of examples 1-6, wherein the server device further may include a model constructor to generate a model for a 3D space in the 3D scene based at least in part on semantic understanding of the 3D space.

Example 8 may include the server device of example 7, wherein the model constructor may be to construct the model based on raw scene data received from one or more cameras and/or sensors.

Example 9 may include the server device of any of examples 1-8, wherein the server device may be to receive model data from one or more cameras and/or sensors.

Example 10 may include the server device of example 9, wherein the server device may be further to provide at least part of the model data to the one or more cameras and/or sensors and, subsequent to provision of the model data to the one or more cameras and/or sensors, receive model-based scene data from the one or more cameras and/or sensors.

Example 11 may include the server device of example 10, wherein the model data received from the one or more cameras and/or sensors may be delta model data.

Example 12 may include the server device of any of examples 1-11, wherein the model may be a voxel-based model.

Example 13 may include the server device of any of examples 1-12, wherein the model data provided to the client device may include only a subset of the model data describing the model of the 3D scene.

Example 14 may include the server device of example 13, wherein the subset of the model data may include model data selected to allow for reconstruction of the scene from the perspective of a viewer using the client device.

Example 15 may include the server device of example 13, wherein the subset of the model data may include model data to allow for reconstruction the scene given a prediction of movement that may be predicted for one or more person in the space.

Example 16 may include the server device of any of examples 1-15, wherein the model/scene predictor may be to provide model data in response to a refresh request from the client device.

Example 17 may include the server device of any of examples 1-16, wherein the semantic understanding may include knowledge of one or more persons that may be located in the 3D scene.

Example 18 may include the server device of example 17, wherein the semantic understanding may include knowledge of one or more of: age, ethnicity, identity, and/or body positions of persons that may be located in the 3D scene.

Example 19 may include the server device of example 18, wherein, for a person for which the person's identity may be shown, the model data may include a known model of the person.

Example 20 may include the server device of any of examples 1-19, wherein the semantic understanding may include knowledge of a room layout and/or one or more objects which may be expected to be located in the room.

Example 21 may include one or more computer-readable media containing instructions written thereon that, in response to execution on a client device, cause the client device to reconstruct a three-dimensional scene by causing the client device to: receive model data received from a server device describing the 3D scene, wherein the model data may be based at least in part on a shared semantic understanding of the scene by the server device and the client device; and render the model data to reconstruct the 3D scene.

Example 22 may include the one or more computer-readable media of example 21, wherein receive model data may include receive model data describing static and dynamic objects, wherein data representing dynamic objects may be received at a greater rate than a rate at which data representing static objects may be received.

Example 23 may include the one or more computer-readable media of example 22, wherein receive model data describing static and dynamic objects may include receive model data describing objects determined by the server device to be more likely to change than a predetermined threshold.

Example 24 may include the one or more computer-readable media of example 23, wherein receive model data describing objects determined to be more likely to change may include receive model data describing objects determined to be more likely to change based on a semantic understanding of the type of object.

Example 25 may include the one or more computer-readable media of example 24, wherein receive model data describing objects determined to be more likely to change may include receive model data describing persons.

Example 26 may include the one or more computer-readable media of example 22, wherein receive model data may include receive delta data for one or more of the dynamic objects.

Example 27 may include the one or more computer-readable media of any of examples 21-26, wherein receive model data may include receive model data received at least in part by the server device from one or more cameras and/or sensors.

Example 28 may include the one or more computer-readable media of example 27, wherein receive model data received may include receive model-based scene data received by the server device subsequent to provision of model data to the one or more cameras and/or sensors.

Example 29 may include the one or more computer-readable media of example 28, wherein receive model data may include receive delta model data from the one or more cameras and/or sensors.

Example 30 may include the one or more computer-readable media of any of examples 21-29, wherein receive model data may include receive data describing a voxel-based model.

Example 31 may include the one or more computer-readable media of any of examples 21-30, wherein receive model data may include receive only a subset of the model data describing the model of the 3D scene.

Example 32 may include the one or more computer-readable media of example 31, wherein the subset of the model data may include model data selected to allow for reconstruction of the scene from the perspective of a viewer using the client device.

Example 33 may include the one or more computer-readable media of example 32, wherein the instructions may be further to cause the client device to send field-of-view data to the server device.

Example 34 may include the one or more computer-readable media of example 31, wherein the subset of the model data may include model data to allow for reconstruction the scene given a prediction by the server device of movement that may be predicted for one or more person in the space.

Example 35 may include the one or more computer-readable media of any of examples 21-34, wherein the instructions may be further to cause the client device to request a refresh from the server device.

Example 36 may include the one or more computer-readable media of any of examples 21-35, wherein the semantic understanding may include knowledge of one or more persons that may be located in the 3D scene.

Example 37 may include the one or more computer-readable media of example 36, wherein the semantic understanding may include knowledge of one or more of: age, ethnicity, identity, and/or body positions of persons that may be located in the 3D scene.

Example 38 may include the one or more computer-readable media of example 37, wherein, for a person for which the person's identity may be shown, the model data may include a known model of the person.

Example 39 may include the one or more computer-readable media of any of examples 21-38, wherein the semantic understanding may include knowledge of a room layout and/or one or more objects which may be expected to be located in the room.

Example 40 may include a sensor device. The sensor device may include a model monitoring means for providing updates to a three-dimensional (3D) scene for reconstruction by a client device. The model monitoring means may include: means for generating model data for reconstruction by a client device describing the 3D scene, wherein the model data may be based at least in part on a shared semantic understanding of the scene by the sensor device and the client device; and means for providing the model data for reconstruction by the client device.

Example 41 may include the sensor device of example 40, wherein the means for providing may include means for providing the model data to a server device in communication with the client device.

Example 42 may include the sensor device of example 40, wherein sensor device further may include means for acquiring sensory data for the 3D scene.

Example 43 may include the sensor device of example 42, wherein means for acquiring sensory data may include a camera.

Example 44 may include the sensor device of example 43, wherein the camera may be to record visual and/or depth data for the 3D scene.

Example 45 may include the sensor device of example 41, and may further include means for receiving an indication of one or more dynamic objects from the server device.

Example 46 may include the sensor device of example 45 wherein means for generating model data may include means for generating model data describing dynamic objects and wherein data representing dynamic objects may be generated at a greater rate than a rate used for providing data representing non-dynamic objects.

Example 47 may include the sensor device of example 46, wherein the means for receiving the indication of one or more dynamic objects may include means for receiving an indication of one or more objects determined by the server device to be more likely to change than a predetermined threshold.

Example 48 may include the sensor device of example 46, wherein the means for receiving the indication of one or more dynamic objects may include means for receiving an indication of one or more objects determined by the server device to be more likely to change based on a semantic understanding of the type of object.

Example 49 may include the sensor device of example 48, wherein the means for receiving the indication of one or more may include means for receiving an indication of one or more persons.

Example 50 may include the sensor device of example 46, wherein means for generating model data may include means for providing delta data for one or more of the dynamic objects.

Example 51 may include the sensor device of example 50, means for generating model data may include means for receiving at least part of the model data from the server device and, means for, subsequent to provision of the model data to the one or more cameras and/or sensors, providing model-based scene data to the server device.

Example 52 may include the sensor device of any of examples 40-51, wherein the means for generating model data may include means for providing voxel-based model data.

Example 53 may include the sensor device of any of examples 40-52, wherein means for generating model data may include means for generating only a subset of the model data describing the model of the 3D scene.

Example 54 may include the sensor device of example 53, wherein means for generating only the subset of the model data may include means for generating model data selected to allow for reconstruction of the scene from the perspective of a viewer using the client device.

Example 55 may include the sensor device of example 53, wherein means for generating only the subset of the model data may include means for generating model data to allow for reconstruction the scene given a prediction of movement that may be predicted for one or more person in the space.

Example 56 may include the sensor device of any of examples 40-55, wherein the semantic understanding may include knowledge of one or more persons that may be located in the 3D scene.

Example 57 may include the sensor device of example 56, wherein the semantic understanding may include knowledge of one or more of: age, ethnicity, identity, and/or body positions of persons that may be located in the 3D scene.

Example 58 may include the sensor device of example 57, wherein, for a person for which the person's identity may be shown, the model data may include a known model of the person.

Example 59 may include the sensor device of any of examples 40-58, wherein the semantic understanding may include knowledge of a room layout and/or one or more objects which may be expected to be located in the room.

Example 60 may include a computer-implemented method. The method may include: receiving, at a server device, from one or more sensor devices, data describing a 3D scene; predicting, by the server device, changes to the 3D scene; and providing, by the server device, to the client device, model data for rendering the 3D scene by the client device, wherein the model data may be based at least in part on a shared semantic understanding of the scene by the server device, the one or more sensor devices, and the client device and may include the data describing the 3D scene and the changes to the 3D scene.

Example 61 may include the computer-implemented method of example 60, and may further include generating, by the server device, a model for the 3D scene based at least in part of the data describing the 3D scene.

Example 62 may include the computer-implemented method of example 61, and may further include sending, by the server device, to the one or more sensor devices, model data describing the generated model.

Example 63 may include the computer-implemented method of example 62, wherein receiving data describing the 3D scene may include receiving delta model data.

Example 64 may include the computer-implemented method of example 61, wherein sending model data describing the generated model may include sending model data describing one or more dynamic objects in the scene.

Example 65 may include the computer-implemented method of example 64, wherein receiving data describing the 3D scene may include receiving data describing dynamic objects at a higher rate than a rate at which non-dynamic objects may be received.

Example 66 may include the computer-implemented method of any of examples 60-65, wherein receiving scene data may include receiving, from the one or more sensor devices, visual data and/or depth data for objects in the scene.

Example 67 may include the computer-implemented method of any of examples 60-66, and may further include acquiring, by the one or more sensor devices, sensory data for the 3D scene.

Example 68 may include the computer-implemented method of any of examples 60-67, further includes rendering, by the client device, the model data to reconstruct the 3D scene.

Example 69 may include the server device of example 1, wherein the model/scene predictor may be to provide model data describing a model of the 3D scene based on a stochastic process.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. One or more non-transitory computer-readable media (CRM) containing instructions written thereon that, in response to execution on a server device, cause the server device to:

receive sensor data inputs for model data describing a model of a scene from at least one remote sensor device;

predict changes to the scene based at least in part on the sensor data inputs received, and provide model data describing the model in view of predicted changes to a client device over a network for reconstruction of the scene on the client device, wherein the model data is provided based at least in part on a shared semantic understanding of the scene by the server device and the client device;

provide at least part of the model data to the at least one remote sensor device; and receive, in response, delta model-based scene data from the at least one remote sensor device.

2. The CRM of claim 1, wherein:
the model data comprises data describing static and dynamic objects; and
the server device is further caused to provide data representing dynamic objects at a greater rate than a rate used for providing data representing static objects.

3. The CRM of claim 2, wherein the server device is further caused to determine a prediction that an object is more likely to change based on a semantic understanding of a type of object.

4. The CRM of claim 2, wherein the server device is further caused to provide delta data for one or more of the dynamic objects.

5. The CRM of claim 1, wherein the server device is further caused to provide model data describing a model of the scene based on a stochastic process.

6. The CRM of claim 1, wherein the scene is a three-dimensional (3D) scene, and the server device is further caused to generate a model for a 3D space in the 3D scene based at least in part on a semantic understanding of the 3D space.

7. The CRM of claim 6, wherein the server device is further caused to construct the model based on raw scene data received from one or more cameras and/or sensor.

8. The CRM of claim 1, wherein the scene is a three-dimensional (3D) scene, and the model is a voxel-based model.

9. The CRM of claim 1, wherein the model data provided to the client device includes only a subset of the model data describing the model of the scene.

10. The CRM of claim 9, wherein the subset of the model data comprises model data selected to allow for reconstruction of the scene from a perspective of a viewer using the client device.

11. The CRM of claim 9, wherein the subset of the model data comprises model data to allow for reconstruction of the scene given a prediction of movement that is predicted for one or more persons in a space.

12. The CRM of claim 1, wherein the server device is further caused to provide model data in response to a refresh request from the client device.

13. The CRM of claim 1, wherein the scene is a three-dimensional (3D) scene, and the semantic understanding includes knowledge of one or more persons that are located in the 3D scene.

14. The CRM of claim 13, wherein the semantic understanding includes knowledge of one or more of: age, ethnicity, identity, and/or body positions of persons that are located in the 3D scene.

15. The CRM of claim 14, wherein the 3D scene is a conference room, and, for a person in the conference room for which the person's identity is shown, the model data comprises a known model of the person.

16. The CRM of claim 15, wherein the semantic understanding includes knowledge of a room layout and/or one or more objects which are expected to be located in the room.

17. A client device, comprising:
one or more computer processors;
a modeler operated by the one or more computer processors to receive model data and additional delta-model based scene data over a network from a server device describing a scene, wherein the model data and additional delta-model based scene data are received based at least in part on a shared semantic understanding of the scene by the server device and the client device, and wherein the model data and additional delta-model based scene data, at least in part, are received by the server device over a network from a remote sensor device; and
a renderer operated by the one or more processors to render the model data to reconstruct the 3D scene.

18. The client device of claim 17, wherein the scene is a three-dimensional (3D) scene, and wherein to receive model data comprises to receive model data describing static and dynamic objects in the 3D scene, wherein data representing dynamic objects is received at a greater rate than a rate at which data representing static objects is received.

19. The client device of claim 18, wherein the 3D scene is a conference room, and to receive model data comprises to receive delta data for one or more of the dynamic objects in the conference room.

20. A computer-implemented method, comprising:
receiving, by a client device, model data and additional delta-model based scene data over a network from a server device, the data describing a scene, wherein the model data and additional delta-model based scene data are received based at least in part on a shared semantic understanding of the scene by the server device and the client device, and wherein the model data and additional delta-model based scene data, at least in part, are received by the server device over a network from a remote sensor device; and
rendering, by the client device, the model data to reconstruct the scene.

21. The method of claim 20, wherein the scene is a three-dimensional (3D) scene; and wherein receiving model data comprises receiving model data describing static and dynamic objects in the 3D scene, wherein data representing dynamic objects is received at a greater rate than a rate at which data representing static objects is received.

22. The method of claim 21, wherein the 3D scene is a conference room, and to receive model data comprises to receive delta data for one or more of the dynamic objects in the conference room.

* * * * *